United States Patent [19]
Bordelon et al.

[11] Patent Number: 5,887,608
[45] Date of Patent: Mar. 30, 1999

[54] UNIVERSAL SHAFT ADAPTER SYSTEM

[76] Inventors: Leonard J. Bordelon, 121 Chateau St. Michel, Kenner, La. 90065; John P. Gallagher, 4475 Michael La., Farmington, Mo. 63640

[21] Appl. No.: 667,244

[22] Filed: Jun. 21, 1996

Related U.S. Application Data

[60] Provisional application No. 60/000,388, Jun. 21, 1995.
[51] Int. Cl.⁶ .................................................. F16K 51/00
[52] U.S. Cl. ............................... 137/1; 137/271; 251/248
[58] Field of Search ...................................... 137/269, 270, 137/271, 1; 251/248

[56] References Cited

U.S. PATENT DOCUMENTS

| | | | |
|---|---|---|---|
| 4,140,144 | 2/1979 | Dowd et al. | 137/271 X |
| 5,098,063 | 3/1992 | Ronzon | 137/269 X |

*Primary Examiner*—Kevin Lee
*Attorney, Agent, or Firm*—Joseph T. Regard, Ltd.

[57] ABSTRACT

An interface for connecting an actuator and a wide variety of valve types. The presented invention is configured such that any actuator can be manufactured, having only one female splined output shaft as a standard and precision inserts, utilizing powder metallurgy, for example, and be configured to transition the output shaft connection to any output shaft specification, providing the manufacturer the ability to manufacture the main drive component in one standard configuration, and convert it into different configurations as required. Thus, the manufacture gains the ability to mass produce one standard part rather than many special parts requiring design and testing for each change and high costs to produce specials. Particularly, the present invention contemplates a system comprising a rack interface for an actuator linear gear, a pinion member configured to interface said rack, the pinion including an internal shaft configuration configured to interface with the valve coupling component. The present invention provides a compact interface, allowing the actuator to be easily mounted upon the valve unit, without the need for additional mounting apparatus, such as bands, braces, or the like.

14 Claims, 5 Drawing Sheets

UNIVERSAL SHAFT ADAPTER SYSTEM

STATEMENT OF CONTINUING APPLICATIONS

The present application is a continuation-in-part of Provisional Application Ser. No. 60/000,388, filed Jun. 21, 1995, listing as inventor Leonard J. Bordelon and John P. Gallagher, entitled "Universal Shaft Adapter".

TECHNICAL FIELD OF THE INVENTION

The present invention relates valve actuator systems, and more particularly, a new and improved interface for connecting an actuator to a wide array of valve configurations. The presented invention is configured such that any actuator can be manufactured, having only one female splined output shaft as a standard, coupled with precision inserts formed via powder metallurgy, for example, the inserts to be configured to transition the shaft connection of the valve to the output shaft of the actuator. This gives the manufacturer the ability to manufacture the main drive component in one standard configuration, and convert it into different configurations as required, thus giving the manufacturer the ability to mass produce one standard part rather than many special parts requiring design and testing for each change and high costs to produce specials. In addition to the high costs to produce specials, a significant amount of time is saved by being able to convert a standard product into a-special product.

Particularly, the present invention contemplates a system comprising a rack interface for an actuator linear gear, a pinion member configured to interface said rack, said pinion including an internal shaft configuration configured to interface with the valve coupling component. The present invention provides a compact interface, allowing the actuator to be easily mounted upon the valve unit, without the need for additional mounting apparatus, such as bands, braces, or the like.

BACKGROUND OF THE INVENTION

This invention relates generally to the method of coupling the output shaft of an actuator to a valve. Actuators are used to open and close a valve. This invention applies in particular to quarter-turn butterfly valves.

A butterfly valve is a flow control device which incorporates a rotational disk to control the flowing media in a pipe. It generally consists of a body, liner, shaft and disk assembly for insertion between a pair of spaced flanges in a fluid passageway more commonly known as a pipe and having the ability to seal off the flow completely at one extreme of its rotation and the ability to allow maximum flow through the pipe at the other extreme of its rotation and to provide some measure of reduced flow capacity at any point in between these two extremities.

An actuator is a control device mounted on a valve which causes the disk of a butterfly valve to rotate. Actuators are either manual or automatic and can be operated by hand, electronics, pneumatics, hydraulics, or springs. The proper actuator for a given valve application must be selected due to torque requirements imposed by the valve application, the means of operation available or practical at the valve location, and cost.

An actuator can be either manual or automatic. An actuator is the device which mechanically causes disk to rotate. As noted above, actuators can be powered by different power sources; however, for illustration purposes of this invention, a pneumatic actuator is used as an example (FIG. 1).

The rack and pinion mechanism simply consists of a length of linear gearing (rack) and pinion gear, which serves as the rotary output shaft. The gear rack is fitted to or machined directly into an arm on the face of the piston. As the piston strokes, the gear rack engages and drives the pinion at a dimension from the center of rotary output, which is the radius of the pinion shaft (FIG. 1). This produces torque. The stroking length of the piston is limited, so that the actuator produces output torque over 90 degrees (¼ turn) of rotation.

The gear rack contacts the pinion at a point that is a constant dimension from the center of rotation; therefore, the torque output throughout rotation is constant. When the pinion shaft is connected directly to the shaft of a butterfly valve, this provides the most direct connection without the use of brackets and couplings.

To date there are several manufacturers of actuators for direct mount to their own manufacture of butterfly valves. In each case the manufacturer of the actuator must machine an output shaft that is fitted to their own butterfly valve. If a valve manufacturer does not manufacture its own actuator for direct mounting to its own butterfly valve, the valve manufacturer must use an actuator manufactured by another manufacturer and must adapt this actuator to his valve with the use of brackets and couplings.

Quarter turn valves are actuated with either manual or automatic actuators. Automatic quarter turn actuators are commonly pneumatic or electric. When valves are operated by actuators, the actuator usually has to be mounted to the top of the valve using a bracket as a connecting member. The valve shaft is then connected by a coupling to the actuator shaft. The valve is then opened or closed by transferring the torque from the actuator to the valve through the rotary motion of the actuator shaft through the coupling.

In this configuration the actuator shaft has to be of the same general configuration as the valve shaft i.e. if the valve shaft is of a parallel flat configuration the actuator shaft must be of the same female configuration to accept the valve shaft.

To date, each butterfly valve manufacturer presenting a direct mounting capability of its actuator with its valve has to have an actuator of sufficient dimension and output shaft configuration to mount only to and drive only its own manufacture of valves.

The concept of mounting actuators to quarter turn valves has been known in the art for many years. Some of the difficulties encountered with actuators having standard drive dimensions is that a specialty coupling has to be designed and manufactured each time an actuator is mounted or applied to any quarter or half turn valve.

When a special request is made for a connection configuration that is not within the fabricators manufacturing standard, a new shaft for the actuator has to be designed, manufactured, and tested, in order to comply with the requirement This type of request has to be handled as a special project each time, which is costly and time consuming, and often interrupts and delays standard production.

GENERAL SUMMARY DISCUSSION OF THE INVENTION

Unlike the prior art, which apparently did not contemplate a valve adapter system which would allow for the universal application of a particular actuator connection standard to a wide variety of valve configurations, the present invention does so in a cost effective, dependable, and easy to implement fashion. A primary objective of the present invention is to provide one standard output shaft design which has the versatility and flexibility to become an industry standard, accepting a pre-engineered insert of any configuration in order to provide an output shaft of any dimension and configuration within the design parameters and dimensional parameters of the shaft. This invention comprises a pre-engineered system of universal shaft adapters that can be manufactured from standard dies and can be applied within pre-engineered guidelines without testing each new design and configuration.

This invention employs a system whereas the actuator can be manufactured with only one type of female output shaft, as shown in FIG. 6A. Each actuator size having a different output torque will have a different sized actuator output shaft; however, this invention addresses the basic type of connection on each size of actuator to enable the manufacture of one size of actuator with one size of output shaft being capable of being altered by varying the internal shape of the adapter shown in FIGS. 6C ', and 6D–6G.

FIG. 6B illustrates an insert of precision cast metal having thirty-two (32) positioning points on the external diameter. An alternative embodiment of the present invention has sixteen (16) or sixty-four (64) positioning points on the external diameter, matching any amount of positioning points on the internal diameter of the actuator shaft.

Each precision adapter has the same external configuration; however, the internal drive configuration is varied to match the valve shaft configuration desired. FIG. 6D shows the requirements of a parallel flat drive. FIGS. 6C and 6E–6G show some of the more common types and shapes of connections; however, any type and shape of connection is possible with this system.

In summary, this invention teaches a new type of drive shaft configuration for quarter turn and multi turn actuators. Prior art teaches only one type of connection for each actuator size and manufacturer i.e. for each type of actuator manufactured there is only one size and shaft of output drive configuration available. It is virtually impossible to change the output shaft configuration without manufacturing a new shaft for each change desired.

With this invention, almost any output shaft configuration can be matched by the use of the universal shaft adapter "U.S.A.". Industry has found that a standard actuator product had to be used because manufacturers only produced standard products with fixed output shaft dimensions. With the use of the "U.S.A." the following can be achieved.

(a) A standard actuator with a "U.S.A." shaft can be customized for any output shaft configuration.

(b) A standard actuator with a "U.S.A." shaft can be used to retrofit another actuator in the field by the use of the universal shaft adapter with the appropriate shaft dimensions.

(c) A standard actuator with a "U.S.A." shaft can be used by a manufacturer of varying valve types by changing the universal shaft adapter rather than by changing the entire actuator or by making a custom actuator bracket.

(d) A standard actuator with a "U.S.A." shaft can be used to meet the international actuator standard DIN ISO 5211, DIN 3337. This will be covered under another patent application.

BRIEF DESCRIPTION OF THE DRAWINGS

FIG. 6A' is a side view of the output shaft socket of FIG. 6A, illustrating in phantom the output shaft socket configured to accept the pinion design of the universal shaft adapter of the present invention.

FIG. 6C' is an end view of an exemplary pinion socket design configuration of the universal shaft adapter of the present invention.

DETAILED DESCRIPTION OF THE PRESENT INVENTION

Figure 1:
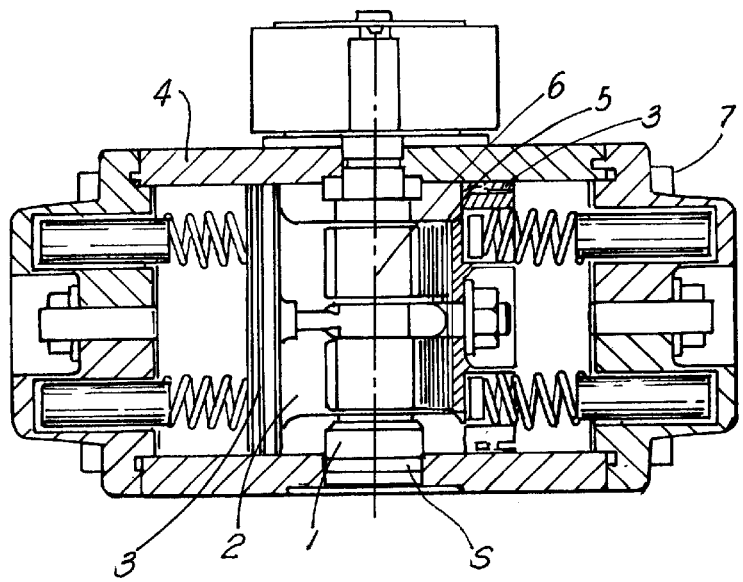
FIG. 1 is a cross sectional view of an exemplary of-the-shelf rack & pinion pneumatic actuator.
Figure 2:
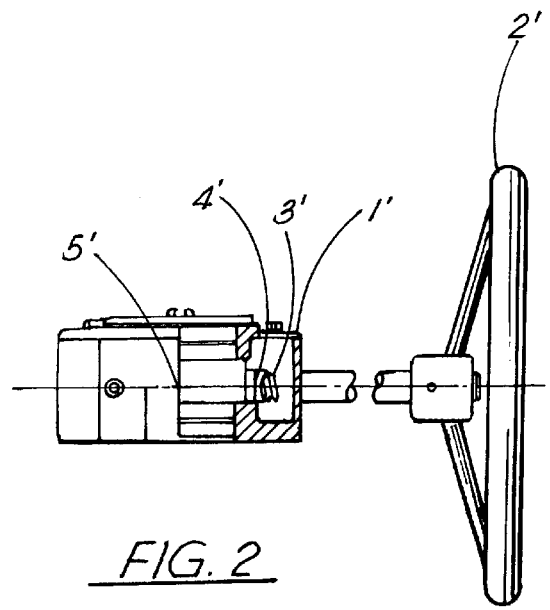
FIG. 2 is a cross-sectional view of an off-the-shelf, manual handwheel gear actuator.

Referring to FIG. 1, a standard pneumatic rack and pinion design actuator 7 is shown, wherein there is provided actuator means for driving a linear driveshaft 1. FIG. 2, illustrates an exemplary standard manual gear actuator 1', which may be implemented in conjunction with the present invention. Both FIGS. 1 and FIG. 2 are standard products having standard output shafts of one dimension only, and are configured for a specific application. If a customer needs a different configuration than the one available in the actuator as a standard, a new design has to be engineered and a new shaft(s) have to be made. If a new shaft is not produced, the only other method presently available is to design and manufacture a mount kit for each application.

To illustrate the operation of the invention, reference should be made to FIGS. 1–4. Referring to FIG. 1, a standard linear driveshaft 1 in a rack and pinion actuator is shown. The principle of operation is when air is applied to the inside chamber between the two pistons 2, the pistons 3 are forced to move outward in a guided cylinder 4. Each piston 3 has a geared rack on the back side 5 and is engaged with the gears on the shaft 1 referred to as a pinion gear 6. When air or fluid is injected in the chamber and reacts on the pistons, the force on the pistons causes the piston and rack to move. The gear teeth on the rack 5 engages the gear teeth on the pinion 6 and causes the shaft 1 to rotate. The rotating action through a shaft coupling is used to open or close a quarter turn or half turn valve.

Figure 5:
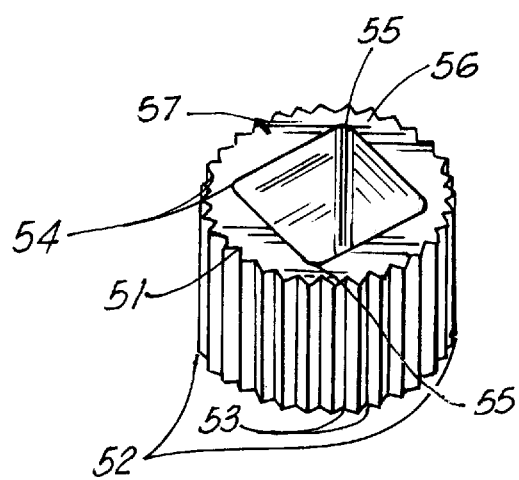
FIG. 5 is a three dimensional view of the universal shaft adapter of the present invention, showing the angle of the external mating splines with a typical center connection of an ISO square.

FIG. 5 is a three dimensional view of a precision insert having spline like serrations around the outer periphery which engage with precision internal spline like serrations machined inside the end of the actuator shaft 1 of the actuator of FIG. 1, forming a sockets. The external 52 of the splined adapter is of a constant pre-engineered diameter for each size rack and pinion actuator or bandwheel gear actuator. The tooth profile 53 is of pre-engineered design and it's ability to resist torsional strength has already been predetermined through engineering and verified through testing. Engineering and testing has been performed on the inserts having the thinnest section 54; therefore, any center connection of smaller dimension will be designed with a built in safety factor.

Figure 3:
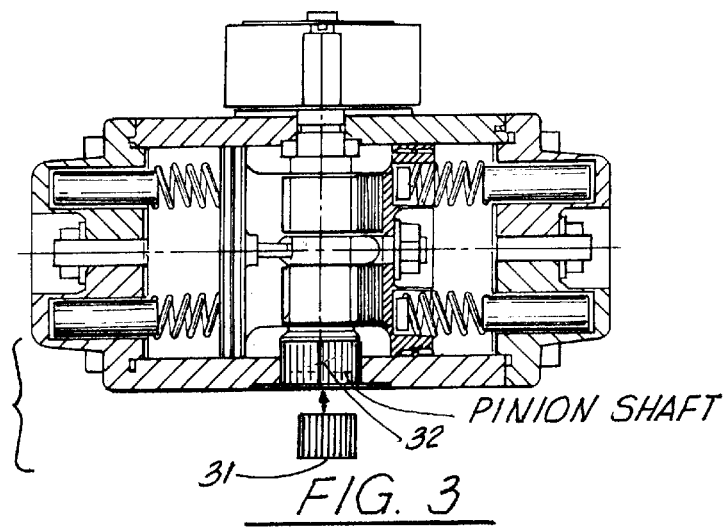
FIG. 3 is a cross sectional view of a rack & pinion pneumatic actuator with a universal shaft adapter of the present invention.
Figure 6D:
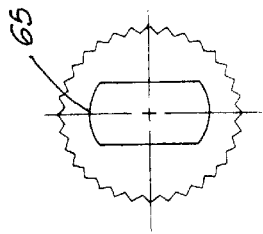
FIG. 6D is an end view of an exemplary parallel linear socket design configuration of a universal shaft adapter of the present invention.
Figure 6G:
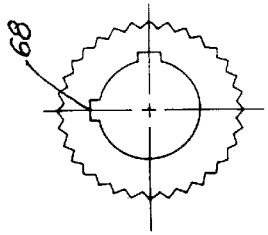
FIG. 6G is an end view of an exemplary keyed socket design configuration of a universal shaft adapter of the present invention.
Figure 6C:
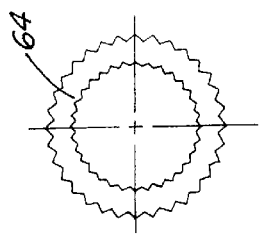
FIG. 6C illustrates a side view of the pinion design of the universal shaft adapter of the present invention.
Figure 6C:
Figure 6F:
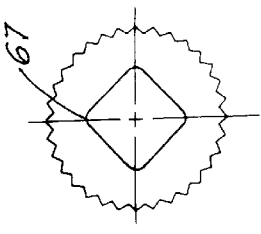
FIG. 6F is an end view of an exemplary diamond linear socket design configuration of a universal shaft adapter of the present invention.
Figure 6B:
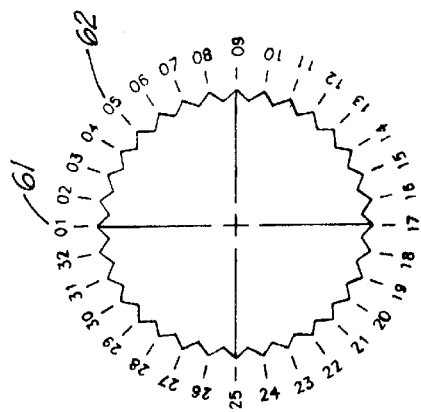
FIG. 6B illustrates the 32 point configuration of the exemplary pinion design of the universal shaft adapter of the present invention.
Figure 6E:
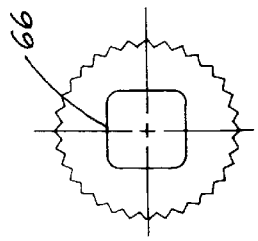
FIG. 6E is an end view of an exemplary square linear socket design configuration of a universal shaft adapter of the present invention.
Figure 6A:
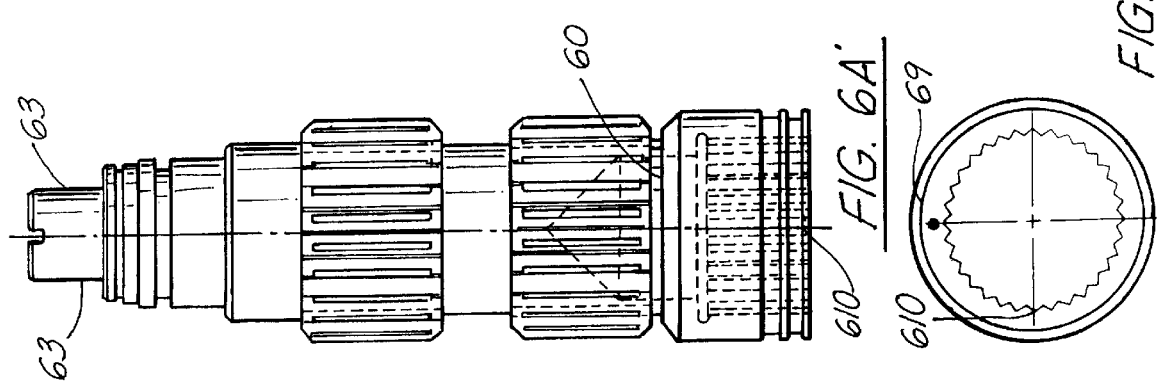
FIG. 6A is an end view of the output shaft socket of the linear shaft of an exemplary pneumatic actuator, having a configuration to accept the pinion design of the universal shaft adapter of the present invention.

The universal shaft adapter splined insert is marked with two orientation marks for proper alignment of the insert 31, FIG. 3 into shaft 32. One insert mark 57 FIG. 5 is located at the 01 position 61, FIG. 6 and the other positioning mark 56, FIG. 5 is located at forty five degrees from that mark or at the 05 position, 62, FIG. 6. One orientation mark 9, FIG. 6A is installed on the shaft to center all shaft, and thereby shaft insert orientation with the flats 63, FIG. 6A' of the shaft. Other orientation marks if required can be installed in the insert or the shaft if this should ever be required.

The universal shaft adapter splined insert can be manufactured in many different internal configurations to adapt to the required valve or driven component. Some of the general shapes of the center driving section are shown in elements 64, 65, 66, 66C, and 67, FIGS. 6A–6G. Other shapes are possible and can be easily adapted to this system. The same concept of the use of a universal shaft adapter spline in a rack and pinion actuator 31, 32, FIG. 3 can also be used in other types of quarter or half turn rotary actuators such as a manual handwheel gear actuator 1', FIG. 2. The adapter may be fabricated from a variety of materials, including high strength, powder metallurgy formed metals such as, for example, FLN-4205-40.

FIG. 2 shows a cross sectional view of a typical manual handwheel gear actuator. Rotary motion caused by manually turning the handwheel 2' is transferred from a worm gear 3' to a segment gear 4' which turns and transmits the rotary motion to a valve or driven component coupled at 5'. This type of connection in the segment gear normally manufactured standard in one 5' output shaft configuration.

Figure 4:
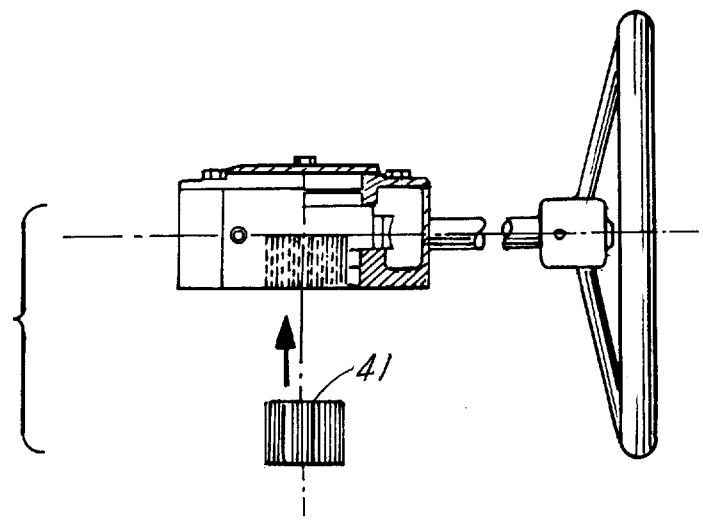
FIG. 4 is a cross sectional view of a manual handwheel gear actuator with a universal shaft adapter of the present invention

FIG. 4 shows the same handwheel gear actuator as in FIG. 2 except fitted with the with the 41 universal shaft adapter splined insert. The segment gear 4', FIG. 2 is machined with one splined female insert per model. Socket 610, shown in FIG. 6 can now accept any insert as shown on 64–68 as shown on FIGS. 6C–6G, respectively, or any other shapes that may he required. Further, the shaft may have a hollow portion directly above the socket area, so as to allow the passage of excess shaft of a valve therethrough, upon mating with a universal valve adapter, in case the valve shaft exceeds the depth of the universal valve adapter.

Figure 7:
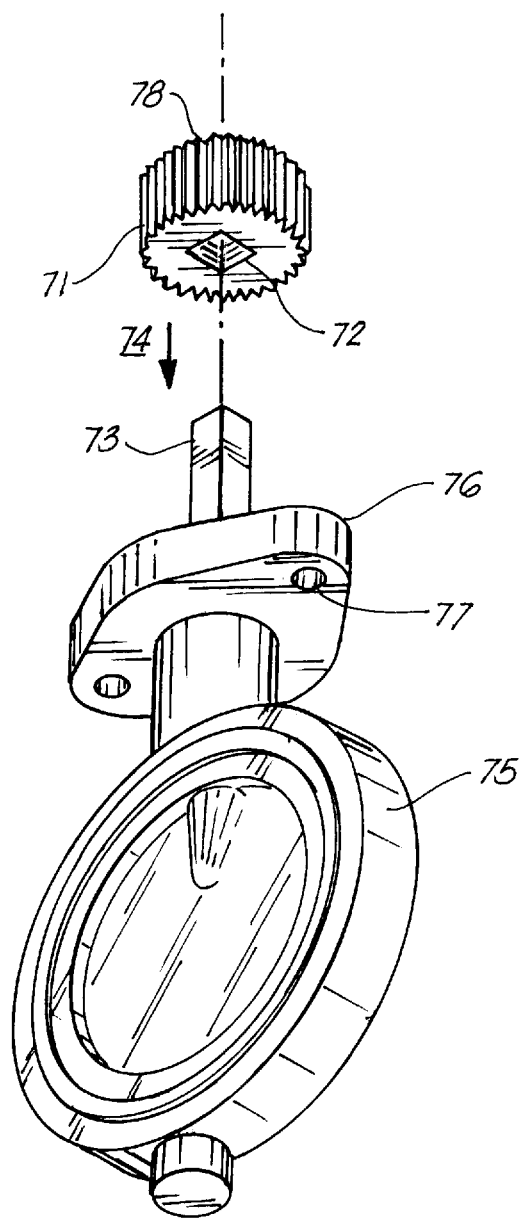
FIG. 7 is an isometric view of an exemplary square socket universal shaft adapter set to engage the shaft of an exemplary butterfly valve.
Figure 8:
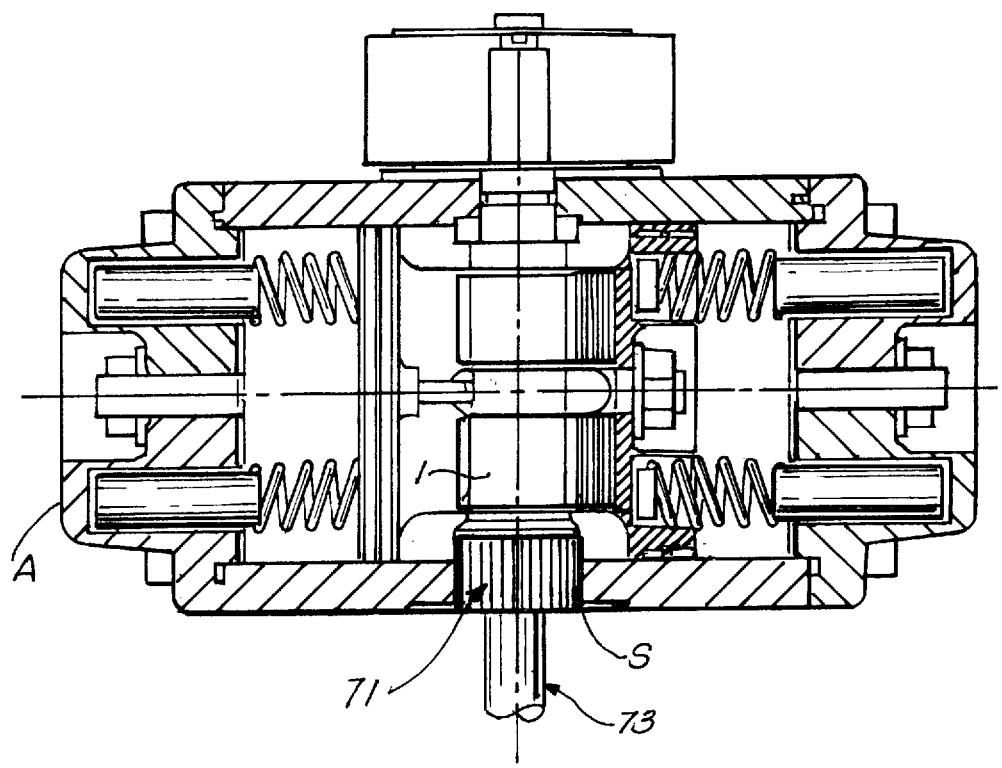
FIG. 8 is a partially cutaway view of an exemplary pneumatic actuator of having a shaft and a socket, with an exemplary universal shaft adapter of the present invention situated in said socket, said universal shaft adapter further engaging a valve shaft.

Referring to the method of the present invention, a universal shaft adapter 71, which could include, for example, the square socket 72 formed therein, is mounted 74 about the rectilinear shaft 73 of a butterfly valve 75. Once mounted, an actuator having a shaft and socket configured to receive the pinion exterior configuration 78 of the adapter 71 as described and shown in FIGS. 6A, 6A', may be mated, and mounted upon the valve via shank, and anchored via threaded connectors through bolt holes 77. Referring to FIGS. 7 and 8, with the adapter 71 mounted 74 to the shaft 73 of the valve, an actuator A having a drive shaft 1 having a socket S so that the adapter 71 engages the drive shaft 1 via socket S, thereby allowing the adapter to interface with the valve via shaft 73 and control same. Other valves, having different configuration shafts, may likewise have mounted thereupon the above actuator via other adapters having like configured sockets, such as those shown and described in FIGS. 6C'–6G.

Further, as indicated above, if the height of the valve shaft 73 exceeds that of the adapter 71, such that a portion of the shaft protrudes through the top of the adapter, the actuator shaft may have above its socket area a hollow space, to allow the accommodation of said protrusion therein.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

We claim:

1. A method of coupling an actuator to a valve by means of a pre-engineered and tested insert adapter, comprising the steps of:

a. fabricating an adapter member having formed an exterior engaging area having a first configuration, an axis, and a socket formed therein having a second configuration, said second configuration having an axis;

b. fabricating an actuator member having a base, a linear shaft having first and second ends and a longitudinal axis, said second end of said linear shaft having a socket formed therein, said socket configured to envelope and engage the first configuration exterior engaging area of said adapter member;

c. providing a valve having a shank, and a control shaft emanating from said shank, said control shaft having an exterior formed to engage said second configuration of the socket formed in said adapter member;

d. at least partially enveloping and engaging said exterior first configuration of said adapter member with said socket of said linear shaft of said actuator member, such that the longitudinal axis of said linear shaft is generally aligned with said axis of said socket formed in said adapter member, so as to form a coupled actuator/adapter having the socket formed in said adapter member exposed in an accessible manner;

e. slidingly inserting said socket of said adapter member about at least a portion of said shaft of said valve, allowing said socket of said adapter member to at least partially envelope said shaft of said valve, and continuing to slide said shaft into said socket until said base of said actuator member communicates with said shank of said valve;

f. mounting said actuator to said valve.

2. The method of claim 1, wherein said adapter member is manufactured from powder metallurgy technology from high strength metal FLN-4205-40.

3. The method of claim 1, wherein said adapter member further comprises a plurality of laterally aligned exterior splines about its periphery, said splines parallel to the vertical centerline of said adapter member, and pre-engineered to allow for the transmittal of torque within a specified range per size.

4. The method of claim 1, wherein said linear shaft has a void formed therein adjacent to said socket formed therein, to accommodate excess shaft, which may pass through said engaged adapter member socket.

5. The method of claim 1, wherein there is provided the additional step of providing multiple adapter members, each having multiple alternative socket configuration formed therein, and there is further included the additional step of selecting a particular adapter member having a particular socket configuration for said adapter member to particularly engage the exterior shaft configuration of said valve.

6. The method of claim 1, wherein there is further included the step of providing alignment indicia on said adapter member and said socket formed in said linear shaft, so as to aid in aligning said adapter member to said linear shaft, when engaging same.

7. A method of coupling an actuator to a valve by means of pre-engineered and tested insert adapter, comprising the steps of:

a. fabricating an adapter member having an exterior first configuration, and an axis;

b. fabricating an actuator member having a base, a linear shaft having first and second ends, and a longitudinal axis, said second end of said linear shaft having a socket formed therein, said socket configured for enveloping and engaging exterior said first configuration of said adapter member;

c. providing a valve having a shank, and a control shaft emanating from said shank, said control shaft having an exterior second configuration;

d. forming a socket in said adapter member, said socket aligned with said axis, said socket configured to slidingly engage and envelope at least a portion of said exterior second configuration of said control shaft of said valve;

e. at least partially enveloping and engaging exterior first configuration of said adapter member with said socket of said linear shaft of said actuator member, such that longitudinal axis of said linear shaft is generally aligned with said axis of said socket formed in said adapter member, so as to form a coupled actuator/adapter having an open socket;

f. slidingly inserting said socket having second configuration about said shaft of said valve, allowing said socket having second configuration to envelope said shaft of said valve, and continuing to slide said shaft into said socket until said base of said actuator member communicates with said shank of said valve;

g. engaging said actuator to said shank, mounting said actuator to said valve.

8. The method of claim 7, wherein said adapter member is manufactured from powder metallurgy technology from high strength metal, FLN-4205-40.

9. The method of claim 7, wherein said adapter member further comprises a plurality of laterally aligned exterior splines about its periphery, said splines parallel to the vertical centerline of said adapter member, and pre-engineered to allow for the transmittal of torque within a specified range per size.

10. The method of claim 7, wherein said linear shaft has a void formed therein adjacent to said socket formed therein, to accommodate excess shaft, which may pass through said engaged adapter member.

11. The method of claim 7, wherein there is provided the additional step of providing multiple adapter members, each having multiple alternative socket configuration formed therein, and there is further included the additional step of selecting a particular adapter member having a particular socket configuration for said adapter member to particularly engage the exterior shaft configuration of said valve.

12. The method of claim 7, wherein there is further included the step of providing alignment indicia on said adapter member and said socket formed in said linear shaft, so as to aid in aligning said adapter member to said linear shaft, when engaging same.

13. The method of claim 7, wherein said exterior second configuration of said adapter member comprises a pinion arrangement having 32 points.

14. The method of claim 7, wherein said exterior second configuration of said adapter member comprises a pinion arrangement having 64 points.

* * * * *